United States Patent
Morimoto et al.

(10) Patent No.: US 6,351,706 B1
(45) Date of Patent: Feb. 26, 2002

(54) NAVIGATION APPARATUS WITH NAVIGATION DATA PROCESSOR AND MAN-MACHINE INTERFACE

(75) Inventors: Kyomi Morimoto; Junzo Matsuba, both of Okazaki (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/651,373

(22) Filed: Aug. 30, 2000

(30) Foreign Application Priority Data

Aug. 30, 1999 (JP) .......................... 11-243002
Aug. 30, 1999 (JP) .......................... 11-243003

(51) Int. Cl.[7] .............................. G08G 1/123
(52) U.S. Cl. .................. 701/208; 701/207; 345/123; 345/124; 345/425; 340/995
(58) Field of Search ................... 701/200, 201, 701/207, 206, 208, 212, 213, 214; 340/990, 995; 345/123, 124, 125, 133, 139, 421, 425, 433, 442

(56) References Cited

U.S. PATENT DOCUMENTS

| 5,712,656 | A | * | 1/1998 | Ikeda et al. ............. 345/133 |
| 5,757,290 | A | * | 5/1998 | Watanabe et al. ........ 340/995 |
| 5,944,768 | A | * | 8/1999 | Ito et al. .................. 701/200 |
| 6,016,110 | A | * | 1/2000 | Takinami ................. 340/995 |
| 6,169,552 | B1 | * | 1/2001 | Endo et al. .............. 345/427 |
| 6,202,026 | B1 | * | 3/2001 | Nimura et al. ........... 701/211 |

* cited by examiner

Primary Examiner—William A. Cuchlinski, Jr.
Assistant Examiner—Marthe Y. Marc-Coleman
(74) Attorney, Agent, or Firm—Lorusso & Loud

(57) ABSTRACT

A navigation apparatus for displaying a map and including a data storage unit for storing map data, a man-machine interface having a display memory and picture drawing capability for expansion and visualization of display data, for acquiring display data to draw it into the display memory, and for setting up and displaying a display range of graphics; and a navigation data processor for reading map data out of the storage unit, for inputting of locations and present position tracking, and for outputting to the man-machine interface display data to be expanded and drawn in the display memory.

19 Claims, 7 Drawing Sheets

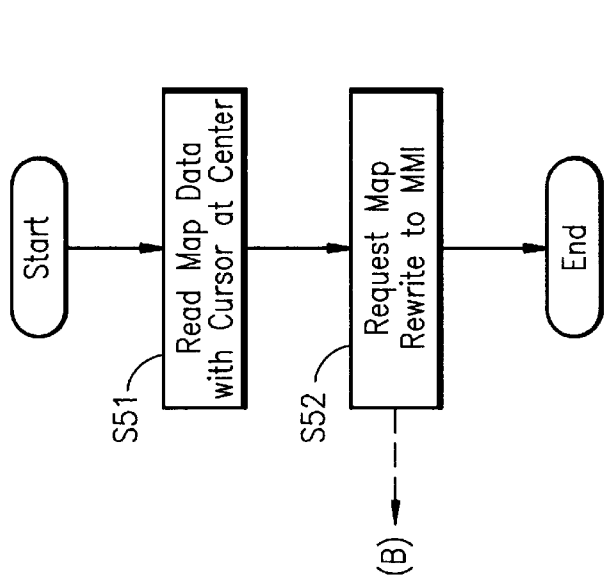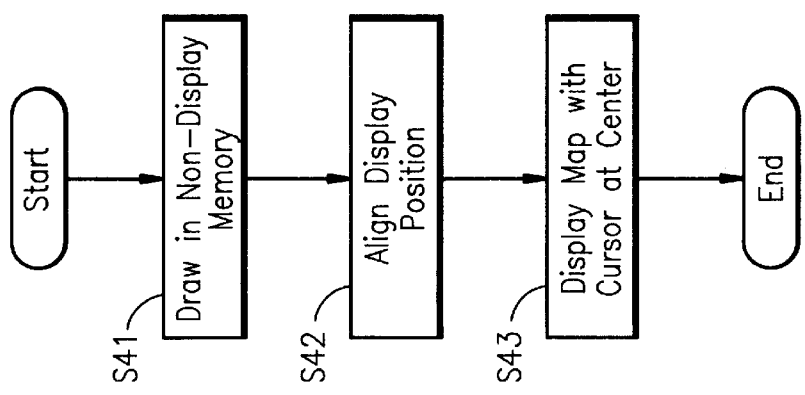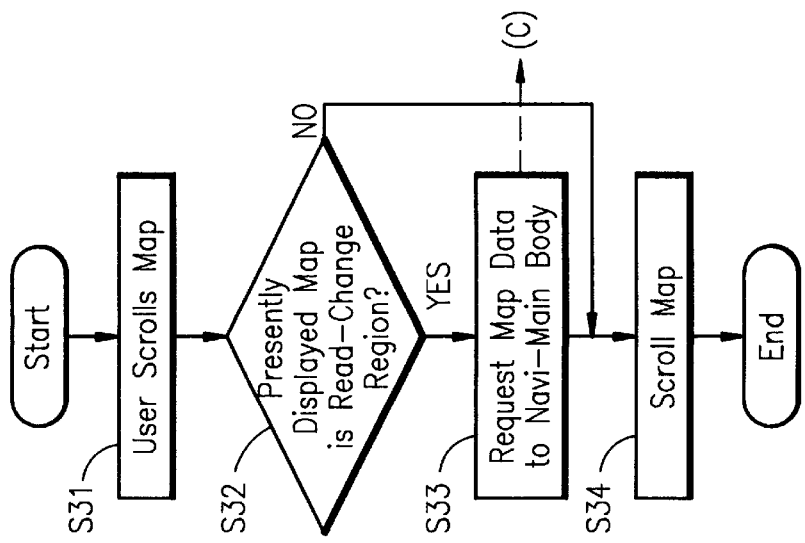
FIG. 5(C) Navigation Data Processor Device
FIG. 5(B) Output Device
FIG. 5(A) Output Device

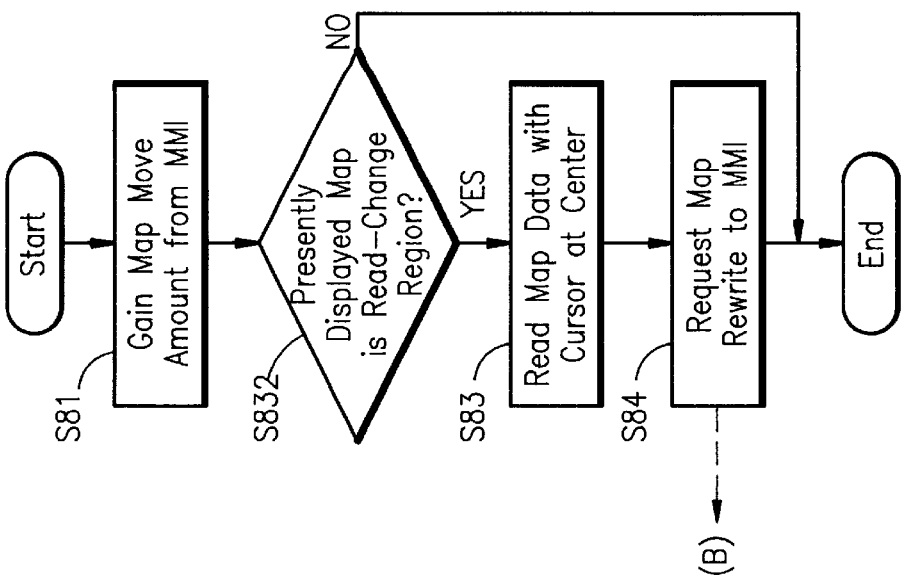
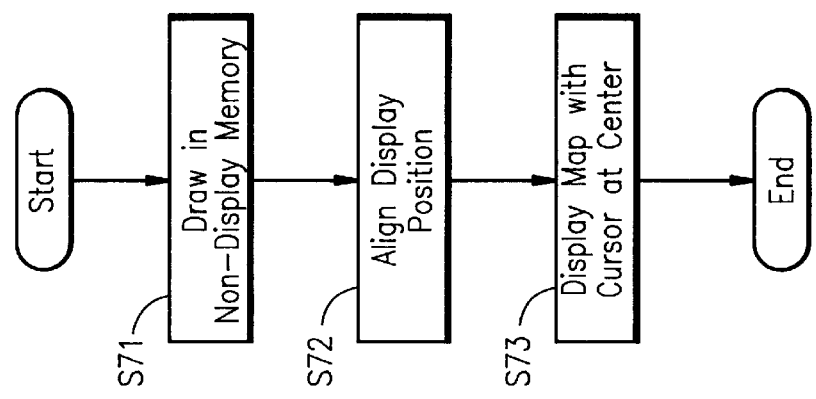
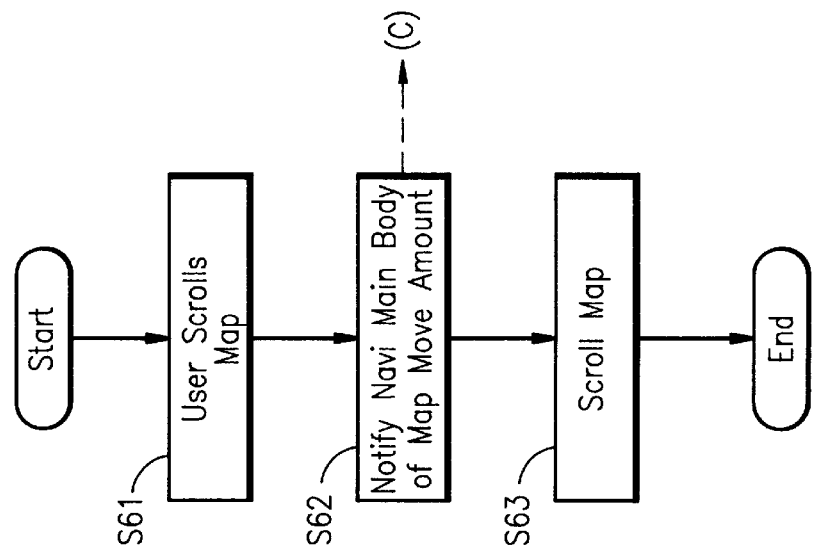

NAVIGATION APPARATUS WITH NAVIGATION DATA PROCESSOR AND MAN-MACHINE INTERFACE

The entirety of Japanese applications Nos. Hei 11-243002 and Hei 11-243003, both filed Aug. 30, 1999, inclusive of the specification, claims and drawings of each, is incorporated herein by reference.

BACKGROUND OF THE INVENTION

1. Field of the Invention

The present invention relates to navigation apparatus for displaying maps and performing location inputting and present vehicle position tracking along with a navigation data processor and a man-machine interface device for use therein. This invention also relates to navigation apparatus for tracking a traveling land vehicle and guiding it to its destination.

2. Prior Art

One typical navigation apparatus is disclosed in Published Unexamined Japanese Patent Application No. Hei 2-28688. This prior art navigation apparatus tracks a land vehicle and guides the vehicle for travel along a route leading to its destination while displaying a map of a specified geographical area in which a present vehicle position is located and further displays, as guidance information, a traffic intersection diagram immediately before reaching a guidance-necessary intersection along the travel route.

The above-described navigation apparatus operates by reading data from stored map data and is provided with picture drawing means for creating graphical images such as lines and filled areas and for outputting them to an associated display means in the form of video signals or RGB signals. Land vehicles are often provided with other built-in devices including functionally overlapping devices which are designed to share common functions through interconnection via a chosen network. In particular, display devices are standardized in most cases—for example, it is well known among those skilled in the art that a display device used to visually display television images is also adaptable for use in displaying an audio instrument panel image. Furthermore, such built-in devices may include means for graphics image creation or "picture drawing".

If the navigation apparatus is connected to a device which has its own picture drawing means, the resultant system would suffer from an extra increase in production cost as a whole. Further, in the event that data communication with a man-machine interface (MMI) is performed from the navigation apparatus by use of bit-map data, the resulting data transfer rate can delay the timing of on-screen image display by an associated output means.

SUMMARY OF THE INVENTION

The present invention has as its objective solution of the above-noted problems, and its primary objective is to enable efficient execution of data communication for land map display to thereby make it possible to smoothly perform map scrolling and rotation, even where the main body of the navigation apparatus is separated from its associated man-machine interface (MMI) unit.

To attain the foregoing objectives, the present invention provides a new and improved navigation apparatus for displaying a map which permits input of a location and allows tracking of a present position and which includes storage means for storing map data, man-machine interface means having a display memory and picture drawing means for expansion and visualization of display data and for acquiring said display data to draw it in said display memory and also for setting up and displaying a display range, and navigation data processor means for reading map data out of said storage means, for executing location input and present position tracking, and for sending to said man-machine interface means display data to be expanded and drawn in said display memory.

Further, the man-machine interface means is operable to manage a drawing range and display range of the display data and to issue to the navigation data processor means a request for transmission of additional display data before the display range goes out of the drawing range. The navigation data processor means is operable to manage a drawing range and display range of the display data and to issue to the man-machine interface means display data being rewritten before the display range goes out of the drawing range. The man-machine interface means has input means for tracking vehicle movement and for inputting of the display range and is operable to set up said display range in response to an input of the input means. The navigation data processor means sends a display range instruction to the man-machine interface means on the basis of the location input and present position.

Also disclosed herein is a navigation data processor in a navigation apparatus which includes, as independently arranged components, the navigation data processor for use in performing navigation data processing and a man-machine interface device for displaying. The navigation data processor device is adapted to read map data out of a storage device for performing location inputting and present position tracking and to output display data to said man-machine interface device wherein the display data is expanded and drawn for visualization in a display memory. The man-machine interface has a display memory and picture drawing means for expansion and visualization of the display data, for acquiring said display data from said navigation data processor and for drawing the thus converted data into the display memory while setting up and displaying a display range of the data stored in the display memory.

Additionally, the navigation apparatus of the present invention tracks a traveling vehicle and guides it to a destination and, to enable such functions, includes storage means for storing map data, a navigation data processor for reading map data out of said storage means, for tracking the traveling vehicle, and for outputting display data and various display commands for use in guidance to the destination, and man-machine interface means, having a memory, for acquiring display data and display commands as output from said navigation data processor means and then expanding and drawing them in said memory to thereby display a range as instructed. The navigation data processor includes means for converting the map data read out of said storage means into display data of a data size and graphical image type in a format as determined for the graphical image to be drawn. The edited display data includes information as to graphical images and display attributes including colors, line thickness and others features, while the display commands indicate a display center, scale or size, and direction.

BRIEF DESCRIPTION OF THE DRAWINGS

FIGS. 5(A), 5(B) and 5(C) are flow charts of a routine for execution by a man-machine interface device adapted for management of display data of a map or maps to be displayed on a screen.

FIGS. 6(A), 6(B) and 6(C) are flow charts showing an example of a routine for execution by a navigation data processor adapted to manage display data of a map(s) to be displayed on the screen.

DESCRIPTION OF THE PREFERRED EMBODIMENTS

Figure 1:
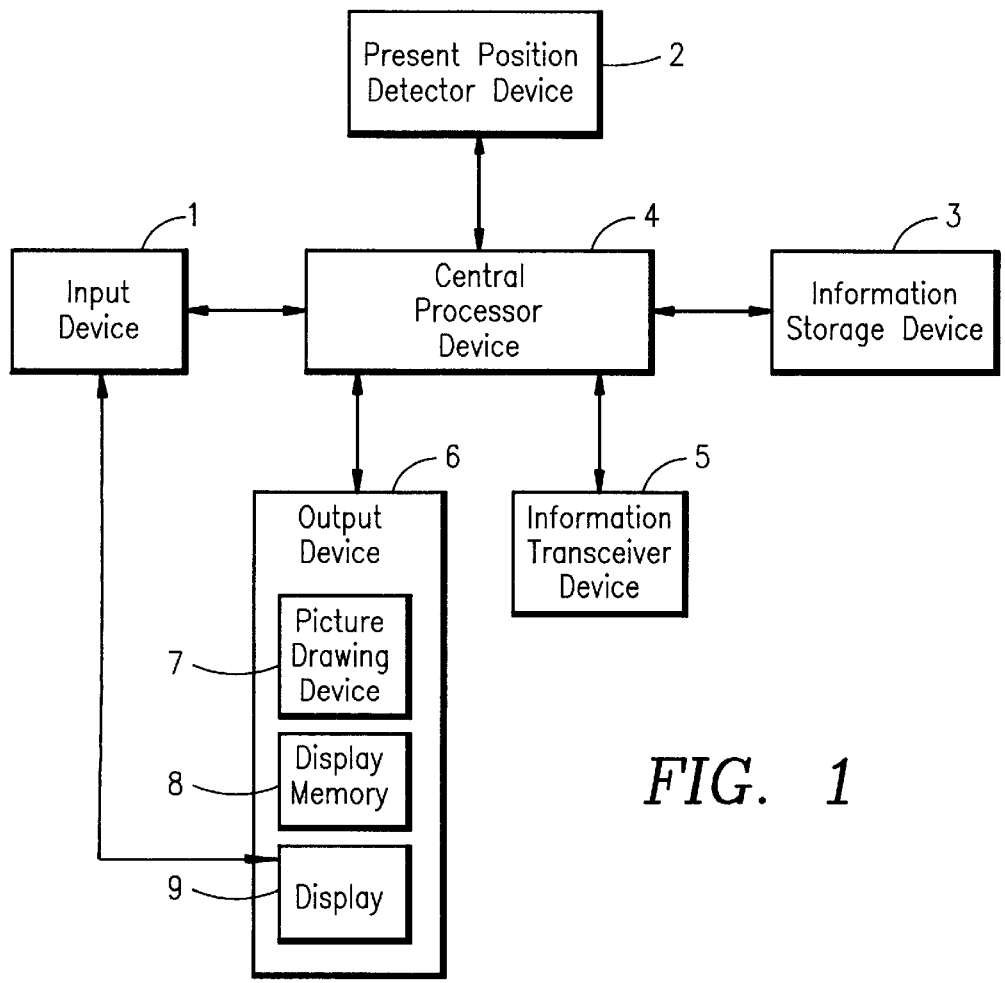
FIG. 1 is a block diagram showing one preferred embodiment of the navigation apparatus in accordance with the present invention.

One preferred embodiment of the present invention will now be explained below with reference to the accompanying drawings. FIG. 1 is a diagram showing an exemplary configuration of a navigation apparatus incorporating the principles of the invention. The illustrated navigation apparatus includes an input device 1 for inputting information related to route guidance, a present position detector 2 for use in detecting information concerning a present position of a land vehicle of interest, an information storage unit 3 which stores navigation-use data required for computation of a geographical travel route and display/audio guidance data necessary for route guidance plus programs (application programs and/or operating system or "OS") and the like, a central processor 4 which serves as the navigation data processor means for executing display/audio guidance routines necessary for route searching and route guidance and for overall control of the entire system, an information transmit/receive device or "transceiver" 5 that is operable to transmit and receive information pertaining to vehicle travel such as, for example, road information and traffic information and information detected concerning the present vehicle position and is further operable to transmit and receive information regarding the present position. As illustrated, the embodiment of FIG. 1 further includes an output device 6 for outputting information for route guidance.

The input device 1 has several functions including inputting of the location of a target or destination and instructing the central processor device 4 to perform navigation processing in a manner consistent with the driver's will. As the means for realizing such functions, remote controllers including, but not limited to, a touch switch or jog dial may be employed to permit inputting of a destination location using a telephone number or coordinates on a land map and also a request for route guidance. In addition the apparatus of the present invention also comes with a device for enabling speech conversion of voice input, which functions as an audio input device. Optionally, a record card reader device may be added for reading data as recorded on IC cards or magnetic cards. A data communications device may also be added for storing therein data necessary for navigation, for transmitting and receiving data to and from an information source, such as a remote information center, and for providing information via communications links in response to a request from a driver. Alternatively, a portable electronic device may be used for storing map data and destination location data along with abridged land maps and building structure shape maps.

The present position detector 2 is a GPS receiver for calculation of the land vehicle's present position and any one of its travel speed and absolute azimuth by utilization of the presently available global positioning system (GPS), a beacon receiver for receiving various items of information such as present position information and traffic lane information, a data receiver that employs a cellular phone (or car telephone) or FM multiplex signals or receives correction signals of the GPS, an absolute direction sensor for detection of the vehicle's travel direction based on the absolute azimuth by use of terrestrial magnetism, by way of example, a relative direction sensor for detection of the vehicle's travel direction based on relative azimuth by using, for example, steering sensors or gyro sensors, or a distance sensor for detecting the traveled distance from the number of rotations of the vehicle wheels, for example.

The information storage unit 3 is a storage device that stores therein navigation programs and data, which device may be any one of the currently available CD-ROM, DVD-ROM, floppy disk, memory card or other similar suitable storage device. Note here that an internal storage device may alternatively be employed, such as a ROM or flash memory built into the main body. The stored programs may include one or more programs for use in performing routines such as route searching, interactive guidance based on audio input control schemes, display/audio output control as required for route guidance, searching for any desired land point, facility or the like. The stored data may include files of all the data necessary for operation of the navigation apparatus, including, but not limited to, map data, search data, guidance data, map matching data, destination location data, registered location data, road data, graphical image data for branch or junction points such as traffic intersections, data classified according to genre, and land-mark data. Note that the CD-ROM as used in the present invention may be the type which stores data only, while the programs are stored in its associated central processor or, alternatively, the type that acquires data and program components from an external facility or equipment through wireless communication.

The central processor 4 includes a CPU for execution of a variety of different kinds of arithmetic processing tasks, a flash memory for storing program components as read out of the CD-ROM of the information storage unit 3, a ROM for storing a program (program reader means) for use in performing verification and update processing of the program stored in the flash memory, and a RAM for temporarily storing searched route guidance information including the coordinates of a destination, road name code No. and the like, along with data obtained by execution of the arithmetic processing. The central processor 4 further includes other components that are not specifically depicted in the drawing, for example, an audio/voice processor for executing programs interactive with voice input through the input device 1 and for voice synthesis, based on an audio/voice output control signal from the CPU, on data read out of the information storage unit 3—such as voice, phrases, sentences organized into a single complete form, sounds or the like—for conversion into an analog signal which is then output to plural speaker units. The central processor 4 may also include a communication interface for handling input/output data over communication links, a sensor input interface for receiving signals from a present position detector 2, and a clock module for use in writing date and time into internal diagnosis information. Additionally, the aforesaid program for executing update processing may be stored in an external storage device, if needed.

All the programs in accordance with the present invention and other programs for executing navigation system routines may be stored in a CD-ROM, i.e. an external recording medium. Alternatively, part or all of such programs may be stored in a ROM 42 that is provided in the main body of the apparatus. Data and programs stored in an external record medium are input as external signals to the central processor in the navigation apparatus main body and are processed therein to provide a variety of kinds of navigation functions.

As stated previously, the navigation apparatus embodying this invention includes a relatively large capacity flash memory for use in reading programs out of the CD-ROM of the external storage device and a small capacity ROM storing therein a certain program (program reader means) for executing a CD startup routine. The flash memory is a nonvolatile memory capable of retaining once-recorded information even after any interruption of the electric power supply thereto. In the CD startup processing, the program stored in the ROM, serving as the program reader means, is started to check/verify the program stored in the flash memory, thereby reading thereinto disk management information or the like of the CD-ROM of the information storage unit 3. A program load routine (update processing) is executed depending on a result of determination from this information and the status of the flash memory.

The information transceiver 5 is formed of several devices including a GPS receiver for gaining information by use of the global positioning system (GPS), a VICS information receiver for gaining information by using FM multiplex broadcasting, radio-wave beacons, optical beacons and the like, and a data transmit/receive or "transceiver" device for two-way or bi-directional exchange of information with the information center (e.g. ATIS) or other land vehicles.

The output device 6 functions to output guidance information whenever requested by the vehicle driver, in the form of audio voice and/or display images, and also to output raw data, or navigation-processed data at the central processor 4 in the form of printed matter. As the means for realizing such functions, in order to visually display on the screen the data processed by the central processor 4 and (raw) data stored in the information storage unit 3, the navigation apparatus of the present invention includes a functional module 7 for image expansion and visualization of display data (essentially data items of figures and components), a display memory 8 used therefor, a display unit 9 for displaying the image data as drawn or "painted" in the memory, a printer for outputting as printed matter or hard copy the data processed in the central processor 4 and data stored in the information storage unit 3, and one or more speaker units for outputting route guidance in the form of voice and sounds.

The display unit 9 is typically a lightweight and slim liquid crystal display module, which is operable to visually display on its screen an enlarged graphical image of a traffic intersection, based on map data being processed by the central processor 4 and guidance data, along with related information such as the name of a destination, time, distance, and an arrow indicative of a travel direction. It is also possible, by sending image data to the display as bitmap data, to employ a communications link for serial communication events rather than exclusive-use or "dedicated" image signal transfer lines, wherein the communications link is used in common with other with communications. The display may be designed to have a memory for temporarily storing therein bitmap data where necessary.

The display unit 9 is provided within an instrument panel adjacent to a driver's seat so that the vehicle driver is allowed to verify a present vehicle position through viewing of this display, while obtaining desired information pertaining to a travel route. Additionally, although specific depiction is omitted herein, the display unit 9 may be designed with a touch panel or touch screen used on the view screen of the display unit 9 to enable land point input and road input through screen touch or dragging. Thus, input device 1 and display unit 9 may be integrated into a single unit.

In the embodiment of FIG. 1 the man-machine interface (MMI) is illustrated as a combination of an output device 6 and an input device 1, for ease of explanation, wherein a picture drawing or "visualizer" device 7 (data processor) for creating a graphical image to be output and displayed and also an image memory 8 for storage of such an image thus visualized are incorporated into the output device 6. However, it should be noted that the configuration of FIG. 1 may be replaced with other configurations having interconnection of devices such as the output device, input device, navigation apparatus, etc. One possibility is a configuration wherein the output device does not have a picture-draw device for visualization of a desired image but, rather, one of the other devices connected to the navigation apparatus over a chosen network has such a picture-draw (visualizer) device.

Figure 2:
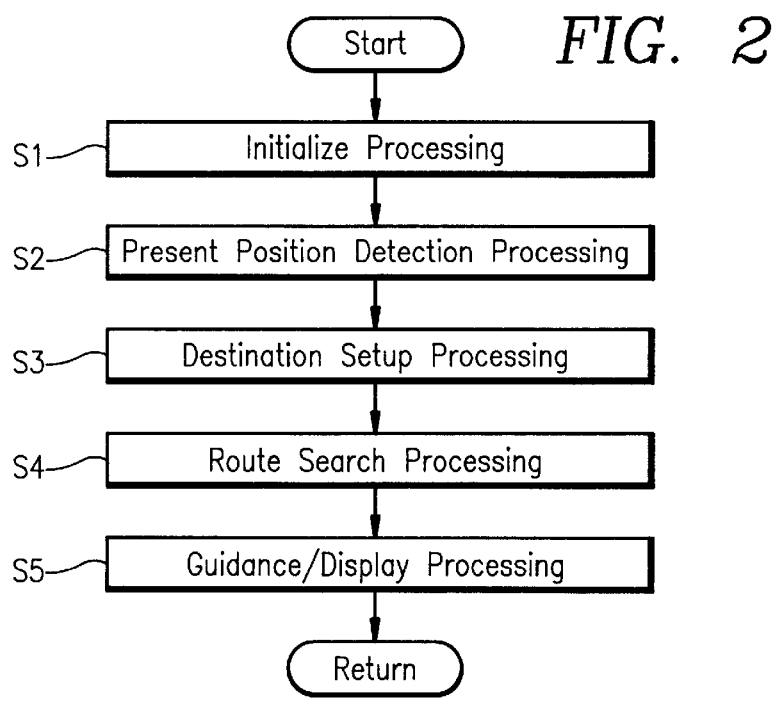
FIG. 2 is a flow chart of a main routine for operation of the overall navigation apparatus in accordance with the present invention.

FIG. 2 is a flow chart of the main program for control of the overall system of the navigation apparatus embodying the invention. Upon startup of the route guidance program which has been loaded from the information storage unit 3 into the central processor 4, the present position detector 2 is rendered operative to detect a present vehicle position, and a map of a selected peripheral land area centered on the present position is displayed with indication of the title or name of the present position (at step S1). Then, a destination is set by input of a target name such as a name of a place or facility, telephone number, address, registered land point, road name, or the like (step S2). Next, a search is conducted for an appropriate travel route leading to the destination from the presently detected vehicle position (step S3). After determination of such a route, route guidance is recurrently provided until the vehicle actually arrives at its destination while at the same time tracking the present position with the detector 2 on a real time basis (step S4). In the case of a request for detour input prior to arrival at the destination, a search area is established for again performing searching or "re-searching" within that search area and, thereafter, route guidance is repeatedly executed until the vehicle actually reaches its destination in a manner similar to that discussed above.

The navigation apparatus has a plurality of functions provided by various modes of operation such as a mode for setup of desired land points, a route search mode as described above, a guidance information output mode, a map display mode and others, wherein selection of one of these modes (functions) is under the control of mode management means. A method of controlling the navigation apparatus will now be explained under the assumption that the apparatus is used connected with other devices over a network. Here, in the event that a device having its own visualizer means is connected or connectable over the network, if the navigation processor unit is so controlled as to draw a graphical image by use of this externally available visualizer means through transmission of necessary display commands and data, it becomes possible to avoid providing the navigation apparatus per se with any visualizer means and picture-draw memory for storing the images thus drawn.

Additionally, a scheme for outputting a display image to the output means will be explained using, as a specific example, display of a map. Firstly, the navigation processor judges a map area or region containing the present vehicle position and then reads map data out of its associated information storage means. Then, such read data is used to prepare display data along with information items such as positions and colors plus line thicknesses and other features being added thereto, in a specific format as determined for the graphics figure to be drawn. Next, the visualizer means expands and visualizes the data as sent thereto, e.g. converts the received data into a bit map, and then stores the thus converted data in the picture-draw memory. Note here that providing the MMI with a memory for storing display data as output from the navigation processor unit makes it possible to smoothly perform any intended map rotation and zooming tasks. In such a case, the output means may be designed to include a memory for storing both data of a display region and the data of such draw memory. However, the memory for storing display region data may be provided independent of the draw memory. Next, in case the map is moved, e.g. scrolled with movement of the present position, the MMI unit continuously or repeatedly draws additional data as needed from the draw memory for output at the display- unit while judging whether or not the display region stays within a region being presently stored in the draw memory. If the former extends beyond the latter then a request is issued to the navigation apparatus to provide the next map information. It should be noted that such region determination may be made based on a read-in reference region that is slightly larger than the display region or alternatively a read-in region smaller than the region of the draw memory. Next, the navigation processor unit detects issuance of a map information request from the MMI and then executes new map data reading. Since provision of an operation mode management unit in such navigation processor unit makes it possible to judge the availability of a request from the MMI side, to select any necessary mode in reply to this request, and also to produce display data, it becomes possible to separate the navigation processor unit for computing a present vehicle position and calculating route information while instructing guidance information to be output from the visualization processor unit for drawing picture images as required.

Figure 3:
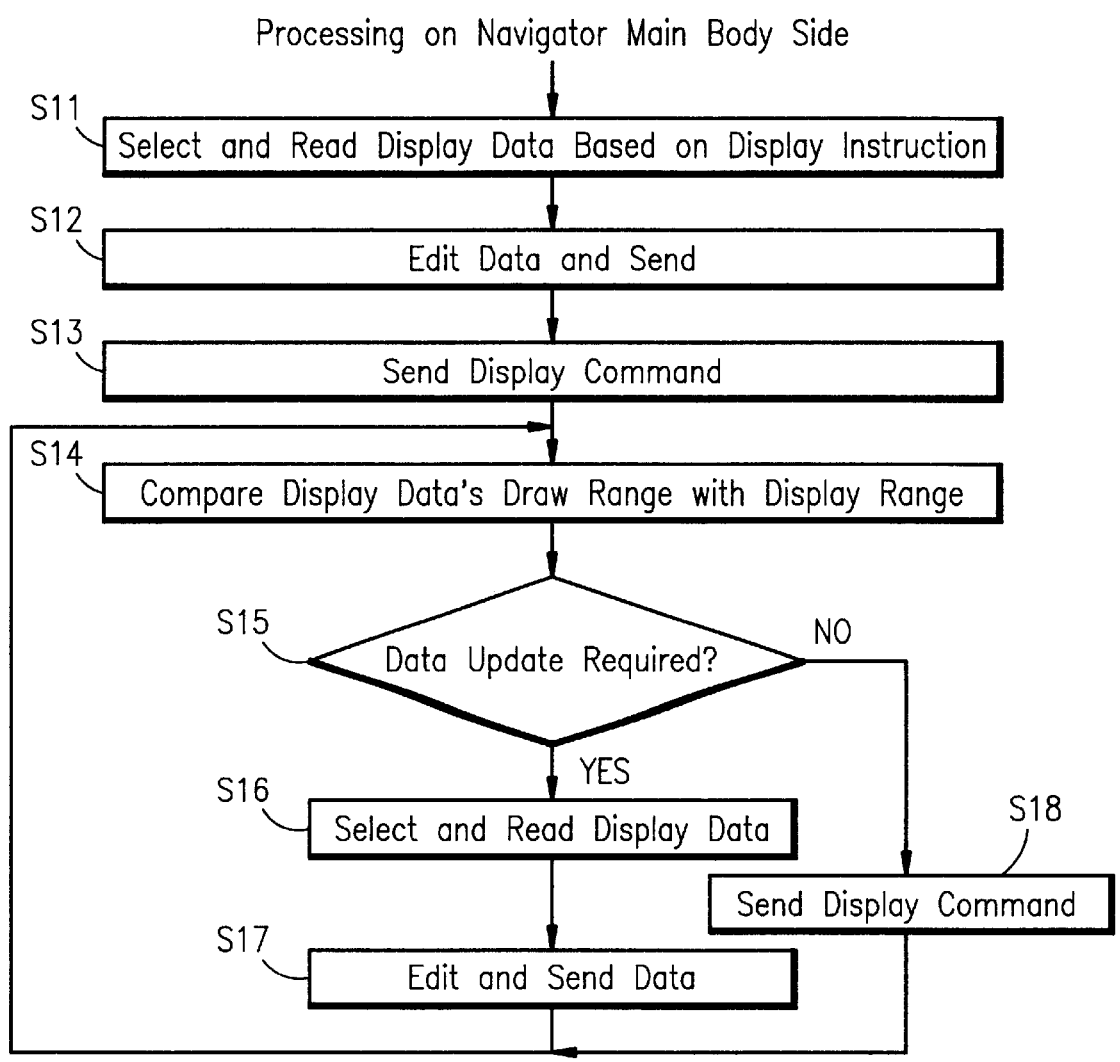
FIG. 3 is a flow chart of a display control routine for execution by a navigation data processor.
Figure 4:
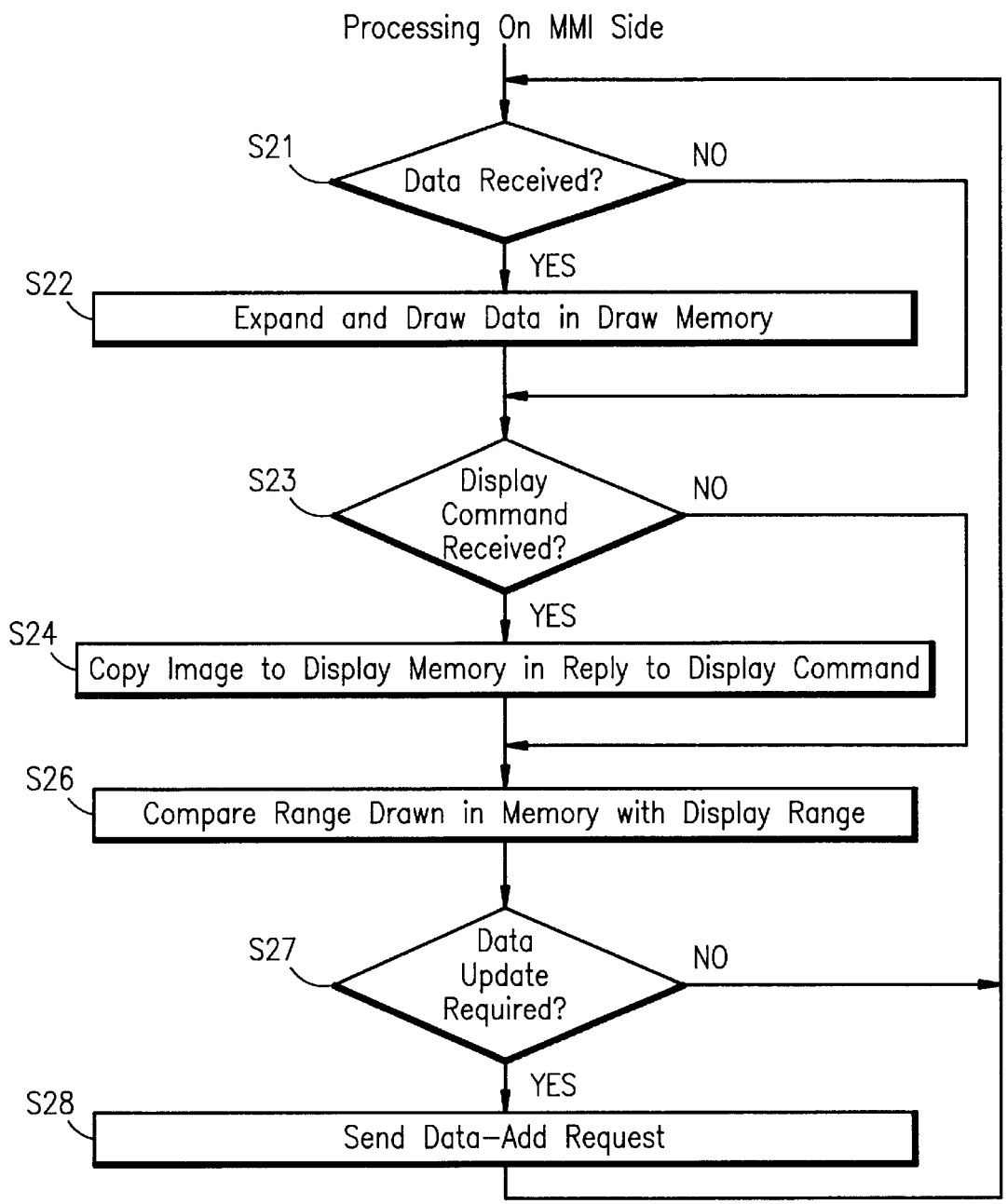
FIG. 4 is a flow chart diagram of one example of a display processing routine for execution by a man-machine interface.

FIG. 3 is a diagram for explanation of an example of the display control processing in a navigation data processor device, and FIG. 4 is a diagram for explanation of exemplary display processing of a man-machine interface device.

The navigation apparatus in accordance with the present invention permits transmission of display data of a land map to be displayed and display commands, for example, from the navigation data processor which includes the central processor device 4 to the man-machine interface (MMI) device, to permit the MMI device to expand and draw or "visualize" the display data for displaying on the screen a specified geographical area as a display region, in a manner dictated by a display command. The display data as used herein is the data prepared on the basis of map information and guidance information or data for drawing an intended diagram, with certain information items such as positions and colors plus line thicknesses and other display features being added thereto in a format determined for the image to be drawn. Further, information as to data sizes and graphical figure types may be added thereto if necessary. Examples of display commands include a command that instructs what range of a map thus expanded and visualized should be displayed using some parameters including, but not limited to, its center and dimension (size) along with coordinates at the upper right and lower left portions thereof, a command that instructs the direction of a display of a map such as in the case of displaying a map with a present vehicle position at its center and with the vehicle orientation set as the upward direction, and a command that instructs a scaling ratio or magnification as well as contraction scale for zooming. In regard to the display commands, in cases where the present position is tracked and displayed with the travel direction being upward, when an orientation (direction of travel) is instructed, display data will be expanded and visualized in accordance with the orientation instruction and the detected present vehicle position, and a map with the present position as its center and with the travel direction set upward will be displayed.

If the navigation data processor is designed to manage the display data and display range, display data for a fixed area is transmitted while moving the display range in accordance with a display command to permit scrolling and, when the display range approaches a geographical limit of the transmitted display data, display data for a new area is sent. On the other hand, if the MMI device is designed to control the display data and display range, display data sent from the navigation data processor is expanded for visualization, while moving (scrolling) the resultant display range in accordance with a display command and, when the display range approaches the limit of the geographical area covered by the data subjected to expansion and visualization, a request command is sent to the navigation data processor device for acquisition of necessary, additional display data. Additionally, in view of the fact that the present position is determined by the navigation data processor during present position tracking, the navigation data processor can instruct the MMI device to provide a display range with a present vehicle position being at its center. On the other hand, when map scrolling and zooming (shrinking/enlargement) is to be done based on the user's land point input, an input unit for inputting of the user's instructions such as a remote controller or touch switch is provided or is included in the MMI device, thereby permitting the MMI device to perform map scrolling within the geographical range of data drawn in a display memory, in accordance with the user's instructions, while requesting the navigation data processor to send display data for a new area as the need arises.

A practical example of a routine is shown in FIG. 3, wherein the navigation data processor first reads selected display data on the basis of a display instruction (at step S11), then edits and transmits such display data (step S12), and further outputs a display command (step S13). For example, where a map is displayed for execution of route guidance while tracking a present vehicle position, a display command can be generated which is indicative of a display range with a presently detected vehicle position being at its center or, where a map is displayed for designation by manual input of land points, such as destination and/or a pass-through point, a display command is issued which indicates a display range with a land point, as designated in accordance with input of its address, genre, telephone number or the like, being at its center. Another display command can be issued for movement of the center of the display range and/or for zooming of the display range, along with an instruction for scrolling and/or zooming of the present position.

The picture drawing range of the transmitted display data is compared with the display range as instructed by the display command (at step S14); then, it is judged whether or not it is necessary to send display data for a new area (step S15). For example, if the remainder of the picture draw range is less in the direction of scrolling and thus a shrunk image display can result in over-sizing from the picture draw range, then a judgement is made that data transmission is necessary ("YES")—in this case, additional display data is selected and read (step S16), and then such display data is edited and sent (step S17) . The steps S14, S15 are for the case in which the navigation data processor manages both the display data and display range. Where the MMI device is adapted to manage the display data and display range, a judgement is made as to whether or not a display data request command is received from the MMI device and then display data, as selected in accordance with the request command, is read (Sl6) and such display data is next edited and sent (S17).

However, if enough room is still available even after completion of movement or shrinkage of the display range within the picture draw range, then a judgement is made that additional data transmission is not necessary ("NO"), and then to continue to send the display command (step S18). Thereafter, the routine returns to step S14 which recurrently executes similar operations of sending necessary data and display command(s), while simultaneously controlling scrolling and rotation plus shrinking/enlargement of the map being visually displayed in the MMI device.

The MMI device may operate as shown in FIG. 4. Upon startup of display, a judgement as to whether or not display data is received from the navigation data processor (step S21) and whether or not a display command is received therefrom (step S23) . Upon actual receipt of the display data, the display data is utilized to draw or visualize and the data thus processed is stored in the draw memory (step S22). Upon receipt of a display command, an image within a display range is copied into the display memory in accordance with such display command (step S24) and then the image within the display range is displayed on the screen. In summary, in this case, both a memory for the drawing processed display data and a display memory for the screen image are employed.

Further, the range of the drawn picture data, i.e. the display data which has been expanded and visualized, is compared with the display range as instructed by the display command (step S26), and then a judgement is made to whether or not it is necessary to read out and send display data for a new area (step S27)—if YES, then a display data add request command is sent to the navigation data processor (step S28). Steps S26–S28 are for the case where the MMI device handles management of the display data and display range. On the other hand, where the navigation data processor manages such display data and display range, the processes of steps S21–S24 will be repeated.

FIGS. 5(A)–5(C) are diagrams of one example of a map scrolling routine in the case where the MMI device handles management of display data of a map being displayed on the screen, whereas FIGS. 6(A)–6(B) are diagrams showing one example of a routine for map scrolling in the case where the navigation data processor manages display data of a map being displayed on the screen.

In the case where the output device (MMI) is adapted to perform management of display data of a map to be displayed on the screen, a routine as shown in FIGS. 5(A)–5(C), for example, is executed. Firstly, as shown in FIG. 5(A), a user's operation for scrolling is detected (step S31). Then, the display region is compared to the region for data being subjected to visualization to thereby judge whether the display region has reached a read-change or "re-read" region as established in the data region (step S32)—if NO then map scrolling is immediately executed (step S34). If YES, then a request is output to the navigation data processor to provide additional display data for the map (step S33) and then to perform map scrolling (step S34).

Upon output of a map request command from the MMI to the navigation data processor at step S33, the navigation data processor performs the processing of FIG. 5(C). The map data request from the MMI side is recognized and then certain road data of a map near or around a cursor position and/or a present vehicle position is read from the storage means (step S51) and, then, display data is created from the map data thus read. For example, the navigation data processor may extract the position coordinates of respective roads, their lengths and shapes, while determining display colors and line thicknesses based on road attributes, number of lanes and road widths, to thereby create transmission data consisting essentially of a graphic format, position, color, line thickness, data size and other features. Next, the resultant transmission data is output to the MMI while simultaneously sending thereto display commands for visualization of a map, e.g. rewriting of a map display (step S52) . Where the road data for a map near the cursor position is read out of the storage means at step S51, the data reading may be based on the direction of map scrolling and scrolling speed with a land point ahead on the travel route being used as a reference.

Upon output of a map rewrite request from the navigation data processor to the MMI at step S52, the MMI executes the routine of FIG. 5(B). The received display data is drawn ("visualized") into one of memories (step S41); then, the display position (display range) is aligned (step S42); and next, a map centered on either the cursor position or present position is displayed (step S43).

Accordingly, the above described data processing utilizes that two separate memories in the MMI device, which are switchably subject to displaying in a way such that one of them is used as a display memory while the other is used as a non-display memory. More specifically, when displaying a map as drawn in one display memory, if the display range leaves the picture draw range then the display is switched to a map of a shifted region in the other display memory. Thus, the memory that has been the display memory now becomes a nondisplay memory.

In the case where the navigation data processor is adapted to perform management of display data of a map to be displayed on the screen, it executes the routine as shown in FIGS. 6(A)–6(C). First, as shown in FIG. 6(A), the MMI device operates to detect a user's operation requesting scrolling(step S61). It then notifies the navigation data processor of the amount of shift of the displayed map (step S62); next, it executes the map scrolling routine (step S63).

Upon output of notice of the amount of map shift from the MMI to the navigation data processor at step S62, the navigation data processor executes the routine of FIG. 6(C). The navigation data processor first acquires the map's shift amount (step S81); then, it compares the display region with a region of data drawn in memory (visualized data) to judge whether or not the display region has been scrolled to a read-change region as set in the data region (step S82). If YES, certain road data of a map near or around either a cursor position or a present vehicle position is read from the storage means (step S83). The navigation data processor then converts the map data into display data, sends the converted data to the MMI, and requests map rewriting (step S84).

Upon output of a map rewrite request from the navigation data processor device to the MMI at step S84, the MMI executes the routine of FIG. 6(B). The display data is input at one of the memories which is not currently utilized for display (step S71); display position (display range)is then aligned (step S72); and a map centered on a cursor position is then displayed (step S73).

Figures 7, 8A, 8B, 8C, 8D, 8E, 8F:
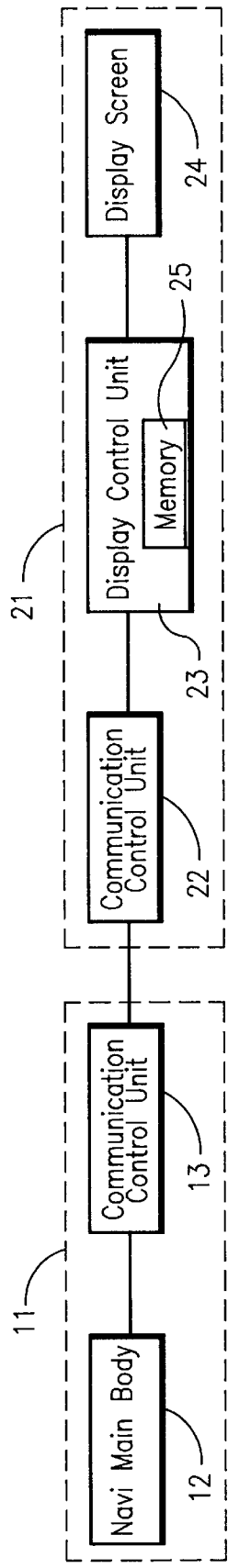
FIG. 7 is a block diagram showing one embodiment of a display control system inclusive of a navigation data processor and a man-machine interface.
FIGS. 8(A)–8(F) are diagrams of an exemplary structure of data being transmitted.

A display control system may utilize the MMI device and the navigation data processor for transmit-and-receive communication of display data via more than one communication line, for example between communications control units 13, 22 as shown in FIG. 7, by way of example. The navigation data processor 12 of a navigation data control device 11 is operable to perform processing tasks including location inputting, land point setup, route searching, present vehicle position detection, tracking, and route guidance, in accordance with instructions from an input device and then, based on the results of such processing, outputs display data and display commands to the communications control unit 13. The communications control unit 13 outputs the display data and display commands, as received from the navigation data processor unit 12, to the communications control unit 22 through a communication line. In addition, upon receipt of a request command from the communications control unit 22, the communications control unit 13 outputs it to the navigation data processor 12.

Operation of the MMI device 21 is as follows. Upon acquisition of display data and display commands at the communications control unit 22 from the communications control unit 13 via the communication line, a display control unit 23 operates to expand the display data for drawing "visualization" into a memory 25, to thereby display an image within a display range on a display screen 24 in accordance with a display command. One preferred approach is that, upon input of display data into the display control unit 23, a memory 25 expands such display data ("visualization") to thereby permit visual display, within a specified address range pursuant to a display command. Another preferred configuration utilizes a display memory for storing display data and display commands and a draw memory for use in expansion ("visualization") of such data, with switching of the two memories between the display use and non-display use, in the manner previously described, with or without a plurality of picture draw memories for visualization of a map with an arrow for route guidance overwritten on the map. In the case where the display control unit 23 is adapted to manage the display data and display range, when new display data becomes necessary, a request command is output to the communications control unit 22 whereby data transmission is initiated from the communications control unit 22, via the communication line, to the communications control unit 13 of the navigation data control device 11.

The display data to be sent from the navigation data control device 11 to the MMI device 21 is such that, as shown for example in FIG. 8(A), the size of such graphics data and type of primitive graphic such as a line, rectangle or other, plus succeeding data, are added to the head the of graphical data, thus providing a data length of an even number, for example. One example of such graphic data is shown in FIG. 8(B), which is a line; another example is shown in FIG. 8(C) which is a rectangle; yet another example is shown in FIG. 8(D) which is an arc; a further example is shown in FIG. 8(E) which is a polygon; a yet further example is shown in FIG. 8(F) which is text data. Each of these data items has information (shape information) as to the coordinates, angle, width, height, length and the like, along with information concerning the display attributes such as the color and line thickness or other attribute.

Figure 9:
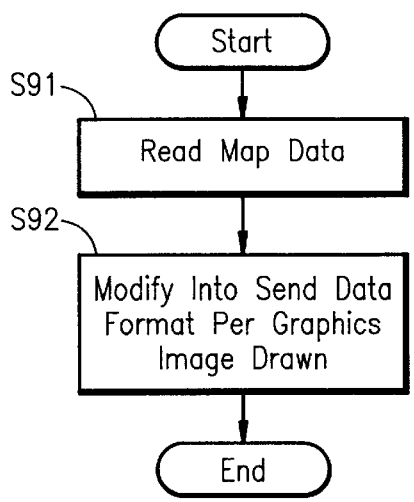
FIG. 9 is a flow chart of an example of a routine for processing of map display transmit data in the navigation data processor.
Figure 10:
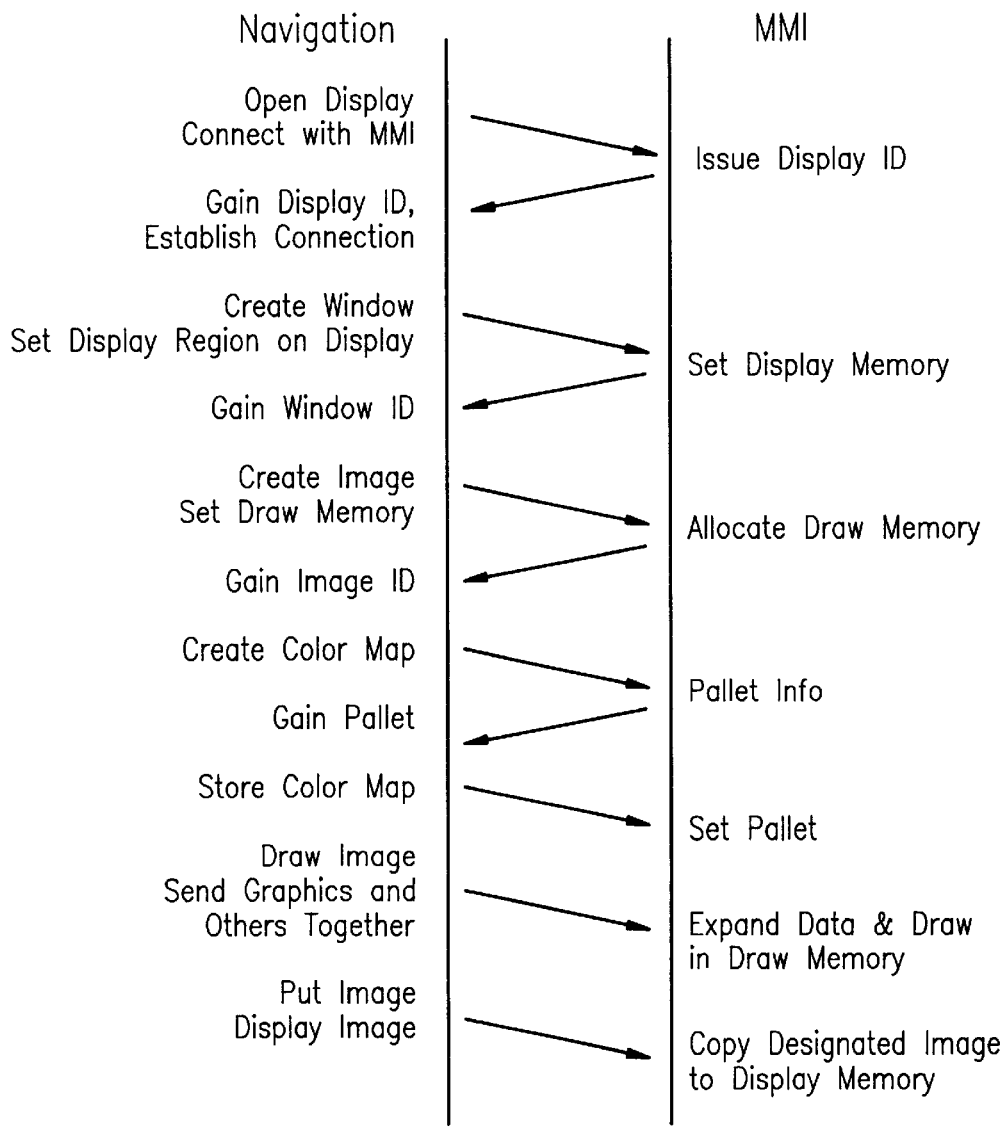
FIG. 10 is a diagram of an exemplary procedure of communications between the navigation data processor and the man-machine interface.

At the communications control unit of the navigation data processor, upon occurrence of map data reading as shown in FIG. 9 (at step S91), the read map data is modified/changed into a transmit data format as shown in FIG. 8 once for each graphical image visualized (step S92), and then sent to the MMI device. An example of exchange of communications between the navigation data processor and the MMI device is illustrated in FIG. 10. First, when a request for connection with the output device (MMI) is issued from the navigation data processor, the output device generates and issues a "Display ID" to thereby permit establishment of mutual connection. Thereafter, a display region is set for the display unit, the picture-draw memory is set-up and color information ("color pallet") is acquired. Then, the navigation data processor outputs an ensemble of graphics together with instructions for display of an image.

It must be noted that the present invention is not limited to only the illustrated embodiments and may be modified in a variety of different ways. For example, although in the above embodiment the MMI device which processes data for drawing maps is described as a unit independent of the navigation data processor operatively associated therewith, the invention may also be applied in a similar way to command processing for menu operations, wherein the processing is executed with input of the user's instructions to the MMI and inputs of vehicle signals to the navigation data processor.

Outputting the transmit data items together through batch processing makes it possible to improve the responsiveness. The color/road width designation may be determined based on a table as prestored in the navigation apparatus main body or, alternatively, determined based on a table prestored in the MMI or, alternatively, determined based on certain data as input and set up by the user. In addition, since the menu processing is such that destination location search is uncertain with regard to what type of switch (such as broad area, detailed, re-search, etc.) should be displayed on the map screen, the navigation data processor notifies the MMI of a switch (function) usable in each mode, thereby allowing the MMI to display such switch at any given location with a desired shape and color. Alternatively, a certain function may be made available at the MMI on a location-by-location basis, while letting the navigation data processor handle the mode management in a way such that when a switch is selected (operated), this selection will be communicated to the navigation data processor, thus causing a presently displayed image to be changed to the next screen.

It must also be noted that, although the present invention has been described as having the navigation data processor unit and the MMI unit arranged as separate components, it can be readily appreciated that the invention may also be applied to an apparatus with the navigation data processor and MMI unit integrated together in hardware configuration and yet separate from each other as software modules. With regard to map scrolling, in addition to the case of tracking of a present vehicle position and moving a map with the present position shown at the center thereof, the present invention may similarly be applied to an embodiment wherein a map is moved while showing the vehicle of interest traveling along a route as defined based on the result of calculation which, in turn, is based on a presently input land point. The invention is also applicable to a system wherein a map is moved through cursor operations during input of a land point or points and/or during zooming (shrinking/enlargement) of the map.

As described above, the present invention is directed to a navigation apparatus with improved functions of inputting of locations and tracking of a present vehicle location while displaying maps. Thus, the apparatus of the present invention includes storage means for storing therein map data, a display memory with an associated graphical image creation means for expansion and drawing of display data, a man-machine interface means for acquiring display data for drawing in the display memory by the graphical image creation means, and for setting up a display range for visual display, and a navigation data processor for reading map data out of the storage means, for location inputting, for present position tracking and for outputting display data to the man-machine interface means for expansion and drawing into the display memory. Even when the navigation data processor and the man-machine interface means are separated from each other, in terms of hardware and/or software, the display data to be expanded and drawn in the display memory, i.e. display data of a map prior to execution of drawing or painting, may be communicated therebetween, thereby making it possible to operate with communication of an amount of data noticeably reduced as compared to the expanded image data (drawn data). Accordingly, it becomes possible to efficiently perform data communications while at the same time enabling smooth execution of map scrolling and rotation.

Another advantage of the invention is that it is possible to design the man-machine interface means in a way adaptable to a user's preferences and to land vehicles without need for modification of the navigation data processor or, the present invention, facilitates design alterations of the navigation data processor means without changing the man-machine interface means. A further advantage lies in an ability to reduce production costs of the navigation data processor because of the fact that it is no longer required to incorporate a picture draw means for visual displaying and a display memory into the navigation data processor.

In accordance with a further aspect of the present invention, a navigation apparatus is provided for tracking a traveling land vehicle and guiding it to reach its destination, which navigation apparatus includes storage means for storing map data, a navigation data processor for reading map data out of said storage means, for tracking the traveling vehicle and for outputting display data and display commands for use in guiding it to the presently set destination, and man-machine interface means having a memory for use in drawing or visualizing display data, for acquiring display data and display command(s) as output from the navigation data processor means, for expanding and drawing the display data in said memory and for visually displaying a commanded range. The navigation data processor includes means for converting the map data as read out of said storage means into certain display data with data size and graphics image type added thereto in a specific format, as determined for the graphical image being drawn, whereby even when the navigation data processor and man-machine interface means are separate from each other, the amount of data communicated therebetween can be reduced as compared to the amount of image data expanded for drawing, so that it becomes possible to increase the data transfer rate accordingly. The use of a scheme for outputting information to be displayed on a display device in the form of display data as prepared from data read from the storage device for information such as positions and colors plus line thicknesses, or in a format predetermined for the graphics image being drawn, makes it possible to visually display any intended image with enhanced viewability without need for partial deletion or interpolation of data with respect to enlargement and shrinkage of land maps. It is also possible to smoothly perform any intended scrolling and rotation of such maps. Additionally, it is possible to design the man-machine interface means in deference to the user's preferences and to adapt to land vehicles, without need for modification of the navigation data processor or the present invention may be applied to facilitate design alteration or redesigning of the navigation data processor without changing the man-machine interface means. Furthermore, since the navigation data processor is no longer required to incorporate therein either the display memory used during displaying or the processor means for drawing or visualizing graphical images, it is possible to likewise reduce the complexity of the apparatus while at the same time reducing manufacturing costs.

The invention may be embodied in other specific forms without departing from the spirit or essential characteristics thereof. The present embodiments are therefore to be considered in all respects as illustrative and not restrictive, the scope of the invention being indicated y the appended claims rather than by the foregoing description, and all the changes which come within the meaning and range of equivalency of the claims are therefore intended to be embraced therein.

We claim:

1. A navigation apparatus for displaying a map for inputting of a location and tracking of a present position, said apparatus comprising:

data storage means for storing map data;

navigation data processor means for reading map data out of said data storage means, for location inputting and present position tracking, for editing the read map data to convert it into display data, and for outputting the display data, said navigation data processor means lacking drawing capability and a memory for storing drawn data;

a man-machine interface unit separate from said navigation data processor means and having a display memory and picture drawing means for receiving the display data from the navigation data processor means, for expansion and visualization of display data, for drawing expanded and visualized data into the display memory as a drawing range of visualized data, and for establishing a display range for a portion of the drawing range of data drawn into said display memory; and a display unit for display of the visualized data within said display range, said display unit moving said display range.

2. The navigation apparatus as recited in claim 1 wherein said man-machine interface unit manages the drawing range and the display range of the display data and issues a request to said navigation data processor means for output of additional display data to change the drawing range before the display range moves out of said drawing range.

3. The navigation apparatus as recited in claim 1, wherein said navigation data processor means manages the drawing range and the display range of the display data and outputs additional display data to said man-machine interface unit before the display range moves out of said drawing range.

4. The navigation apparatus as recited in claim 1, said man-machine interface unit has input means for instructing movement of the display and for designation of the display range and is operable to establish said display range in response to an input of the input means.

5. The navigation apparatus as recited in claim 1, wherein said navigation data processor means sends a display range instruction to said man-machine interface unit on the basis of said location inputting and present position tracking.

6. The navigation apparatus as recited in claim 1, wherein said display data is edited by addition of information as to graphical images and display attributes including colors and line thicknesses.

7. The navigation apparatus as recited in claim 1, wherein said navigation data processor means outputs a display command indicating a display center, scale or size, and direction.

8. The navigation apparatus as recited in claim 1 wherein said man-machine interface unit and said navigation data processor means are separated from each other as separate software modules.

9. The navigation apparatus as recited in claim 1 wherein said navigation data processor means and said man-machine interface unit are separately arranged as separate hardware units linked by at least one communication line.

10. A navigation data processor for use in navigation data processing in a navigation apparatus including an independently arranged man-machine interface device for performing displaying, wherein said navigation data processor device is means for reading map data out of a storage unit, for location inputting and present position tracking and for outputting data to the man-machine interface device for expansion and visualization and storage in a display memory contained within said man-machine interface device, said navigation data processor lacking a drawing capability and a display memory for storing drawn data.

11. The navigation data processor as recited in claim 10, adapted to manage a drawing range for visualized data stored in the display memory and a display range or a display and adapted to read additional data from the storage unit and to output the additional data to the man-machine interface device to be rewritten before the display range goes out of the drawing range.

12. The navigation data processor as recited in claim 10, adapted to output to said man-machine interface device an instruction defining the display range on the basis of said location inputting and present position tracking.

13. A man-machine interface device for use with a navigation apparatus including an independently arranged navigation data processor, lacking a picture drawing capability and arranged separately from said man-machine interface device, for use in performing navigation data processing, said man-machine interface device comprising:
   a display memory; and
   picture drawing means for expansion and visualization of display data, said man-machine interface device acquiring said display data from said navigation data processor device and drawing it into said display memory while establishing and displaying a display range.

14. The man-machine interface device as recited in claim 13, adapted to manage a drawing range and the display range of said display data and to issue to said navigation data processor a request for transmission of additional display data before the display range moves out of said drawing range.

15. The man-machine interface device as recited in claim 13, wherein said input means controls movement of the display and provides for input of the display range and sets said display range responsive to said input.

16. The man-machine interface device as recited in claim 13, comprising two memories as said display memory, said two memories being switchable between use and non-use as a display memory, with one of said two memories being used as a source of data for said display while the remaining memory receives display data for future map display.

17. A navigation apparatus for tracking a traveling vehicle and for guiding it to a destination, comprising:
   data storage means for storing map data;
   navigation data processor means for reading map data out of said data storage means, for tracking the traveling vehicle, and for outputting display data and display commands for use in guidance to the destination;
   a man-machine interface unit arranged separately from said navigation data processor means including a memory used to store drawn display data, and drawing means for acquiring display data and display commands as output from said navigation data processor means and for expanding and drawing the acquired data into said memory for an instructed display range; and
   wherein said navigation data processor means includes means for converting the map data read out of said storage means into display data with a data size and graphical image type added thereto in a format as determined for a graphical image to be drawn by said man-machine interface unit, said navigation data processor means lacking a drawing capability.

18. The navigation apparatus as recited in claim 17 wherein said man-machine interface unit and said navigation data processor means are separated from each other as separate software modules.

19. The navigation apparatus as recited in claim 17 wherein said navigation data processor means and said man-machine interface unit are separately arranged as separate hardware units linked by at least one communication line.

* * * * *